E. Smith.
Pipe Coupling.
No. 98,717. Patented Jan. 11, 1870.
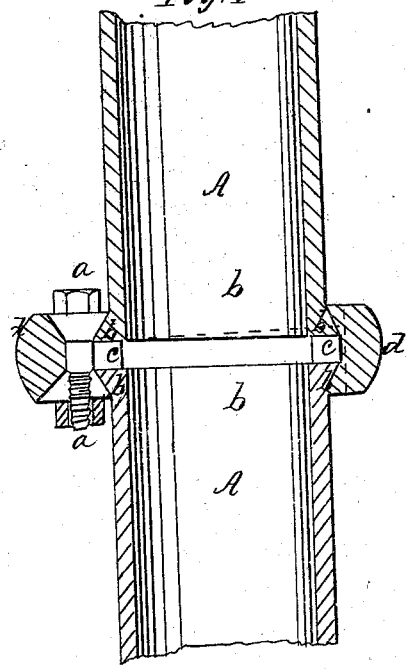
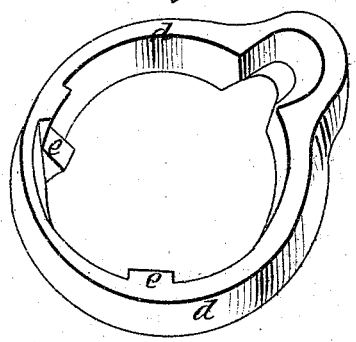
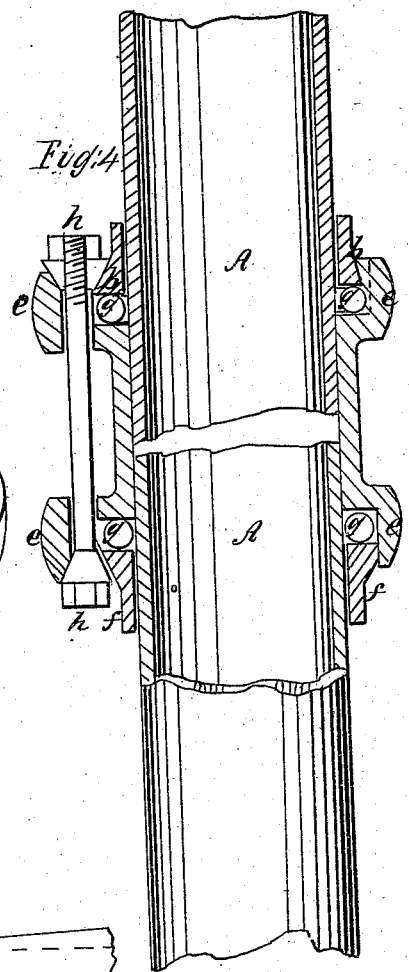
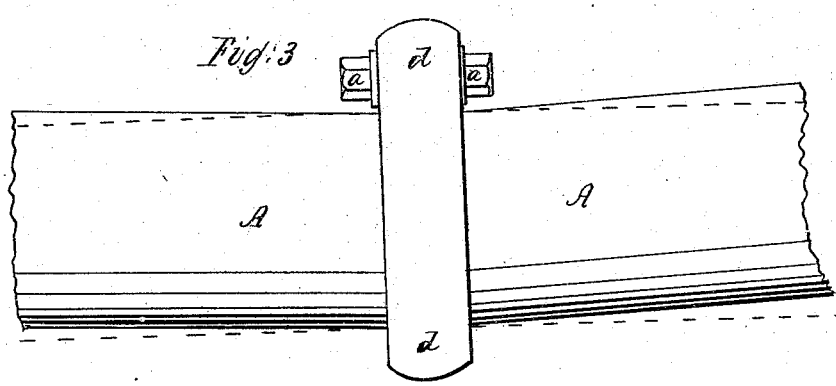
Witnesses
E Sanderson
D J Wells
Inventor
Edmund Smith
n M L Callender & Co
attys

United States Patent Office.

EDMUND SMITH, OF HAMBURG, GERMANY.

Letters Patent No. 98,717, dated January 11, 1870.

IMPROVEMENT IN PIPE-COUPLING.

The Schedule referred to in these Letters Patent and making part of the same.

To all whom it may concern:

Be it known that I, EDMUND SMITH, of Hamburg, Germany, have invented a new and improved Steam and Gas-Pipe; and I do hereby declare the following is a full and exact description of the construction and operation of the same, reference being had to the annexed drawings, making a part of this specification.

Figure 1 shows the two sections of pipe, A A, with bevelled rims or flanges $b$ $b$, secured in line by the band or coupling $d$ $d$, and bevelled or wedge-shaped screw and nut $a$ $a$, a suitable ring or washer, of rubber or other material, being placed between the ends of the pipes, shown at $c$ $c$.

Figure 2 shows a plan of the band or coupling $d$ $d$, with the interior wedge-formed or concave flanges or lugs $e$ $e$, as shown.

Figure 3 shows a plan of the pipe when coupled, with the end or ends of the pipe adjusted at an angle with the axis of the pipe, so as to throw the pipe out of line, (shown by the dotted lines,) for making bends, curves, or angles.

Figure 4 shows a socket or sleeve for joining plain pipe, or broken ends of pipes; also the bevelled rings or bands $f$ $f$, and rubber rings or washers, or other material, $g$ $g$, and bevelled or wedge-shaped screw and nut $h$ $h$, which, when screwed home, compress the rubber rings firmly against the pipe, to form a close and solid joint.

It will be observed that the pipe is constructed perfectly straight, with the exception of the bevelled flanges at the ends, as plainly shown in fig. 1.

The operation of connecting or coupling pipes consists in placing the ends $b$ $b$ together, with the intervening rubber ring or washer $c$ $c$, and securing them in place with the band or coupling $d$ $d$, also shown at fig. 3, which is slipped over the union until the conclave clips or lugs fit the united bevelled projections or flanges of the pipes. Then the screw $a$ $a$, having the wedge-formed head and nut is inserted and screwed home until the bevelled surfaces of the pipe, lugs, and screw, all come in contact. This serves to force the ends of the pipe together, and compresses the packing-ring or washer $c$ $c$ to form a perfectly tight joint, and secure connection.

The dotted lines, fig. 1 and fig. 3, shows the pipe with its end bevelled at an angle (not a right angle) with the axis of the pipe. This will throw the pipe out of a straight line, when coupled, and forms a plan producing curves and angles in laying pipe. By reversing the position of the ends of one or more bevelled pipes, a greater or lesser degree of curvature may be obtained, or when entirely reversed, that is, turned half round, the pipes will be brought into line again.

The socket or sleeve, fig. 4, is intended to join plain pipe, or broken ends, as shown and described. It is also applicable to either wooden, asphalt, cement, or any other kind of pipe. It also affords a ready means of joining a connection or T, by tapping and inserting it in the socket or sleeve, or by casting the sleeve with an elbow or a T.

This invention embodies a simple, efficient, and ready means of connecting and disconnecting piping. It saves the trouble and expense of excavating for the purpose of, and leading the joints, and it avoids the destruction of piping when relaid, or requiring to have a section changed for any purpose. It also avoids the necessity of casting piping in curves, which is both troublesome and expensive.

Having thus described my invention,

What I desire to secure by Letters Patent of the United States, is—

1. The bevelled rims or flanges $b$ $b$, on the outside of the ends of the pipe A, in combination with the clasp-band $d$ $d$, lugs $e$ $e$, and bevelled bolt-head, and screw-nut $a$ $a$, for connecting water or gas-pipe, as herein described.

2. In connection with the above clamping-device, the bevelled or angle-ends of the pipe for making curves in laying, in the manner herein set forth.

EDMUND SMITH.

Witnesses:
E. SANDERSON,
D. J. WILLS.